United States Patent [19]

Baqai et al.

[11] Patent Number: 5,410,726
[45] Date of Patent: Apr. 25, 1995

[54] UPGRADING THE MICROPROCESSOR OF A COMPUTER SYSTEM WITHOUT REMOVAL BY PLACING A SECOND MICROPROCESSOR IN AN UPGRADE SOCKET

[75] Inventors: Shahzad I. Baqai, Sunnyvale; Robert W. Leung; Michael A. Schmitt, both of Freemont; Suheil J. Zaatri, Cupertino, all of Calif.

[73] Assignee: Intel Corporation, Santa Clara, Calif.

[21] Appl. No.: 92,764

[22] Filed: Jul. 16, 1993

Related U.S. Application Data

[63] Continuation of Ser. No. 687,222, Apr. 18, 1991, abandoned.

[51] Int. Cl.$^6$ ............................................. G06F 15/16
[52] U.S. Cl. ...................... 395/800; 364/DIG. 1; 364/DIG. 2; 364/228; 364/230; 364/232.8; 364/927.8; 364/925.6; 364/929.4; 364/929.5; 364/931.4
[58] Field of Search ............... 364/DIG. 1 MS File, 364/DIG. 2 MS File, ; 395/375, 400, 425, 700, 500, 800

[56] References Cited

U.S. PATENT DOCUMENTS 4,716,526  12/1987  Mori et al. ........................... 395/500

FOREIGN PATENT DOCUMENTS

0411806A2  2/1991  European Pat. Off. .

OTHER PUBLICATIONS

Intel 1990 Microprocessor Data Book, Literature Order No. 230843-007, cover page, order information page, title page and pp. 4-1, 4-7, 4-8 and 4-124.

Primary Examiner—Robert B. Harrell
Attorney, Agent, or Firm—Blakely, Sokoloff, Taylor & Zafman

[57] ABSTRACT

A method and apparatus for upgrading a microprocessor-based computer processing systems is disclosed. This method and apparatus provides for normal operation of a non-upgraded microprocessor-based computer processing system yet once upgraded the computer processing system operates from the upgraded microprocessor while the non-upgraded microprocessor is disabled.

26 Claims, 3 Drawing Sheets

UPGRADING THE MICROPROCESSOR OF A COMPUTER SYSTEM WITHOUT REMOVAL BY PLACING A SECOND MICROPROCESSOR IN AN UPGRADE SOCKET

This is a continuation of application Ser. No. 07/687,222, filed Apr. 18, 1991, now abandoned.

FIELD OF THE INVENTION

The present invention relates to the field of computer processing systems. More specifically, the present invention relates to the field of upgradeability of computer processing systems, particularly those employing microprocessors.

BACKGROUND OF THE INVENTION

Microprocessor-based computer processing systems frequently employ printed circuit boards (PCB's) containing connectors or sockets which physically hold the microprocessor chip and make electrical connection between the microprocessor and the remainder of the computer processing system via a PCB. Other common chip (microprocessor memory, etc.) mounting methods include either placing the pins of the chip through holes drilled in the PCB to which the chip will then be soldered or using what is known as surface mounting technology wherein a chip is merely placed on top of, and then soldered to, a printed circuit board. One of the advantages of surface mounting technology is the lower cost of manufacturing as well as avoidance of chip connector costs.

As computer processing system users require greater and greater processing capabilities, the ability to upgrade to a faster processor or add additional functions or features becomes more important. Presently the possible methods of upgrading a microprocessor-based computer processing system are to either replace the existing microprocessor with an improved microprocessor having additional functions or features and/or faster processing capabilities or, instead, to add separate upgrade componentry containing additional functions or features. For example, if a user requires faster mathematical processing capabilities the user has two options: 1) swap the microprocessor chip for a microprocessor chip which can run the same instruction set more quickly, or, 2) attach a math co-processor to the remaining original microprocessor chip which math co-processor would handle off-loaded mathematical calculations from the original microprocessor chip and thus improve overall processing speed.

One problem with adding a separate co-processor chip in order to provide additional functions, features, or performance to an existing processor chip is the performance degradation due to the signal delay between the original microprocessor chip and the upgraded function/feature/performance chip across the PCB which contains the two chips. For instance, in the math co-processor example above, because each mathematical calculation requires transmitting signals back and forth between the original microprocessor chip and the upgraded math co-processor chip, there is an inherent performance sacrifice due to the lower bandwidth of signal lines on a PCB as compared to a silicon wafer or chip.

Modern microprocessors increasingly combine multiple functions and features on a single integrated circuit chip. Such technology typically utilizes Large Scale Integration (LSI) and Very Large Scale Integration (VLSI) to achieve the necessary circuit density to be able to hold all the necessary componentry on a single integrated circuit chip. One of the benefits of increased circuit density, in addition to lowering power requirements, reducing heat generation and avoiding failure rates caused by faulty interconnects between separate chips, is in allowing greater processing speeds due to the ability to operate at the faster LSI or VLSI chip speeds rather than the slower printed circuit board speeds.

Thus, if a user desires to upgrade from a reduced performance chip to a LSI or VLSI all-in-one microprocessor chip in order to gain additional functions, features or performance, the user need merely remove the original microprocessor chip and replace it with the LSI/VLSI chip which can run the same instruction set as the original microprocessor chip. However, one problem with completely replacing the original microprocessor chip with an upgraded function/feature/performance LSI or VLSI microprocessor chip is the possibility of voiding whatever warranty may exist with regard to the entire computer processing system if this chip replacement is not done properly (either because the chip replacement was not done by an authorized technician or because replacement of the original chip might itself void the warranty).

Another problem with complete replacement of the original microprocessor chip with an upgraded function/feature/performance LSI or VLSI microprocessor chip is the requirement that the upgraded chip have identical pin-outs. Having identical pin-outs can be overly limiting in that it may be difficult to access additional functions or features without additional pin-outs to these functions or features.

Another limitation with complete replacement of the original microprocessor chip with an upgraded function/feature/performance LSI or VLSI microprocessor chip is the requirement that the upgraded chip have the same footprint and package type as the original microprocessor. Having the same footprint and package type would likely be necessary in order for the upgraded microprocessor chip to properly attach to the PCB in place of the original microprocessor chip.

SUMMARY AND OBJECTS OF THE INVENTION

One object of the present invention is to provide an improved method of upgrading a computer processing system.

Another object of the present invention is to provide an improved upgradeable computer processing system.

These and other objects of the present invention are provided for by a method of upgrading a computer processing system having a first processor wherein the computer processing system functions with the first processor if a second processor is not present and wherein the computer processing system disables the first processor and functions with the second processor if the second processor is present.

These and other objects are also provided for by an upgradeable computer processing system having an existing processor wherein the upgradeable computer processing system comprises means for connecting to both the existing processor and an improved processor, means for disabling the existing processor upon sensing the presence of the improved processor, and means for utilizing the improved processor instead of the existing processor upon sensing the presence of the improved processor.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for providing upgradeability of functions and/or performance in microprocessor-based computer processing systems is disclosed. In the following description, numerous specific details are set forth, such as specific devices, methods, circuits, timing sequences, etc., in order to provide a thorough understanding of the present invention. It will be obvious, however, to one skilled in the art that these specific details need not be employed to practice the present invention. In other instances, well-known methods and device configurations are not described in detail in order not to unnecessarily obscure the present invention.

Figure 1:
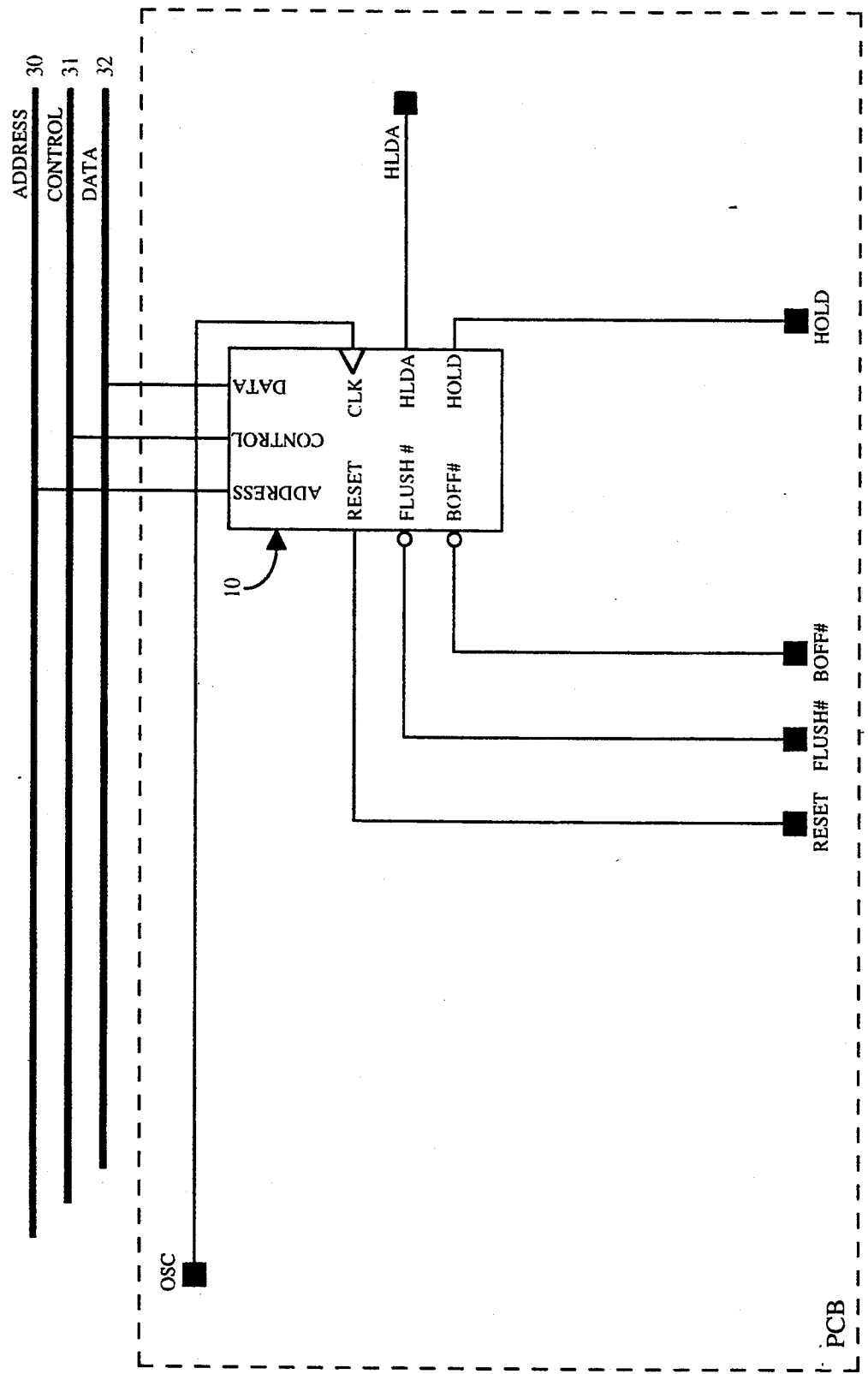
FIG. 1 depicts a portion of a prior art microprocessor-based computer processing system.

Referring now to FIG. 1, a portion of a prior art microprocessor-based computer processing system is shown. The prior art microprocessor-based computer processing system includes a microprocessor chip 10 which provides computing capability to the computer processing system. Microprocessor 10 receives power directly from a signal line on a PCB to which microprocessor 10 is connected via a connector or socket. Of course, microprocessor 10 may be mounted to the PCB via other means such as surface mounting for instance.

Microprocessor 10 communicates with other devices such as input/output devices (e.g., disk drives, printers, plotters, modems), user interface devices (e.g., keyboards, monitors), etc., via ADDRESS bus 30, CONTROL bus 31 and DATA bus 32. The computer processing system of the prior art may also include additional microprocessor chips (not shown) located on other PCBs which microprocessors would also connect to ADDRESS bus 30, CONTROL bus 31 and DATA bus 32 and thereby function and communicate with microprocessor 10. Please note that the specific signal lines shown in FIG. 1 (RESET, FLUSH#, BOFF#, HLDA and OSC) are part of CONTROL bus 31 but are separately shown in order to provide a thorough understanding of the present invention.

Figure 2:
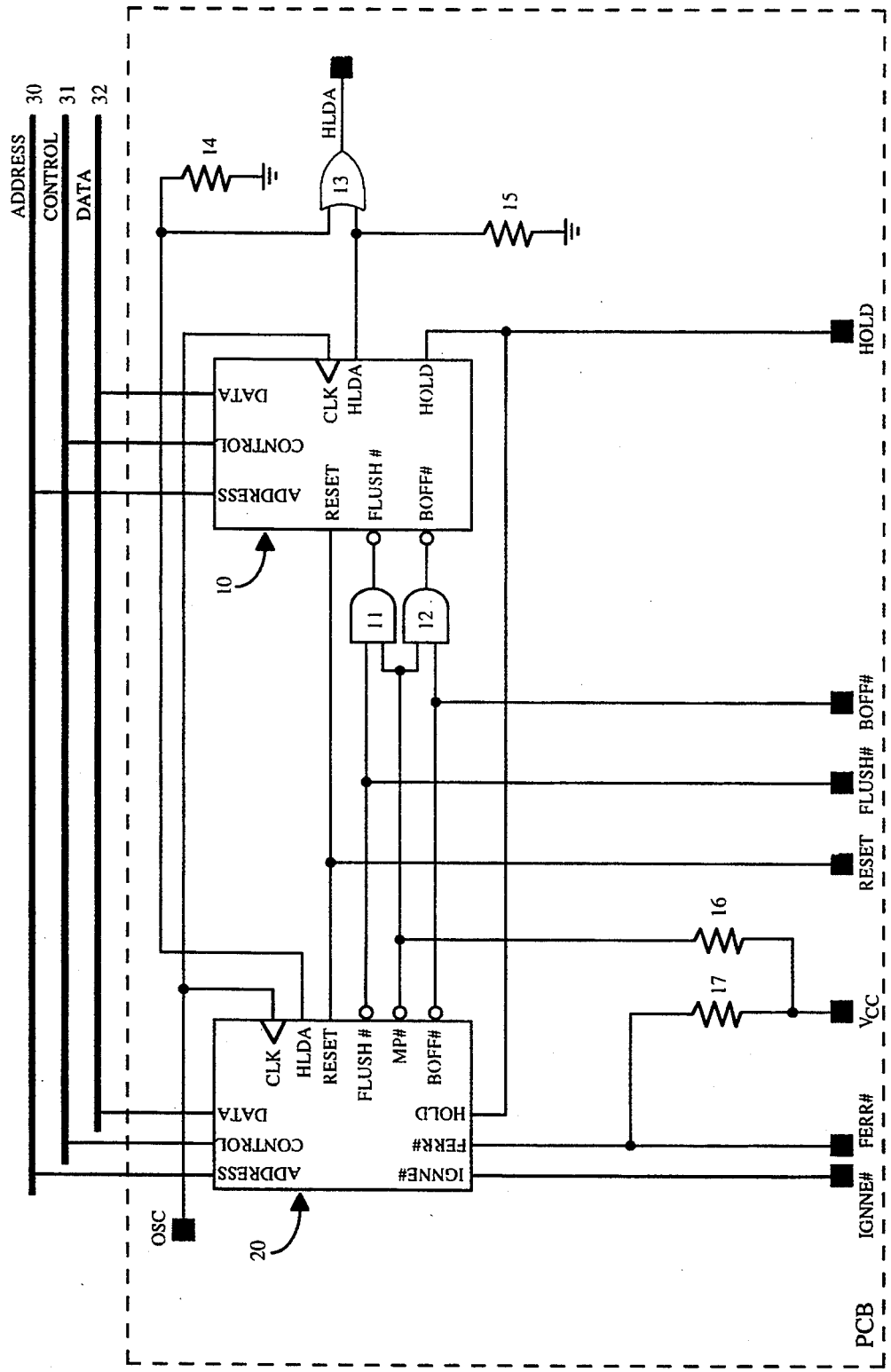
FIG. 2 depicts a portion of the upgradeable microprocessor-based computer processing system of the present invention.

Likewise, specific signal lines which are part of CONTROL bus 31 are separately shown in FIG. 2 where a portion of the upgradeable microprocessor-based computer processing system of the present invention can be seen. In the present invention, microprocessor chip 10, connected to a PCB, may function just as the microprocessor chip 10 did on the prior art computer processing system of FIG. 1. However, in the present invention, there is also the capability of adding or upgrading to a second microprocessor 20 by merely placing microprocessor 20 in a connector or socket located on the PCB to which microprocessor 10 is connected.

In the preferred embodiment of the present invention, placement of a second microprocessor 20 in the socket of the PCB entirely disables the first microprocessor, microprocessor 10. In this way, microprocessor 20 not only provides additional function and/or performance (via, e.g., an improved clocks per instruction rate, an extra unit which was not present on microprocessor 10, an enhanced version of a unit already present on microprocessor 10, etc), hence providing upgradeability, but also provides the original processing functionality of microprocessor 10 (via execution of the same instruction set as did microprocessor 10). Therefore, when microprocessor 20 is placed in the socket of the PCB, microprocessor 20 takes over all of the processing functions of microprocessor 10.

Figure 3:
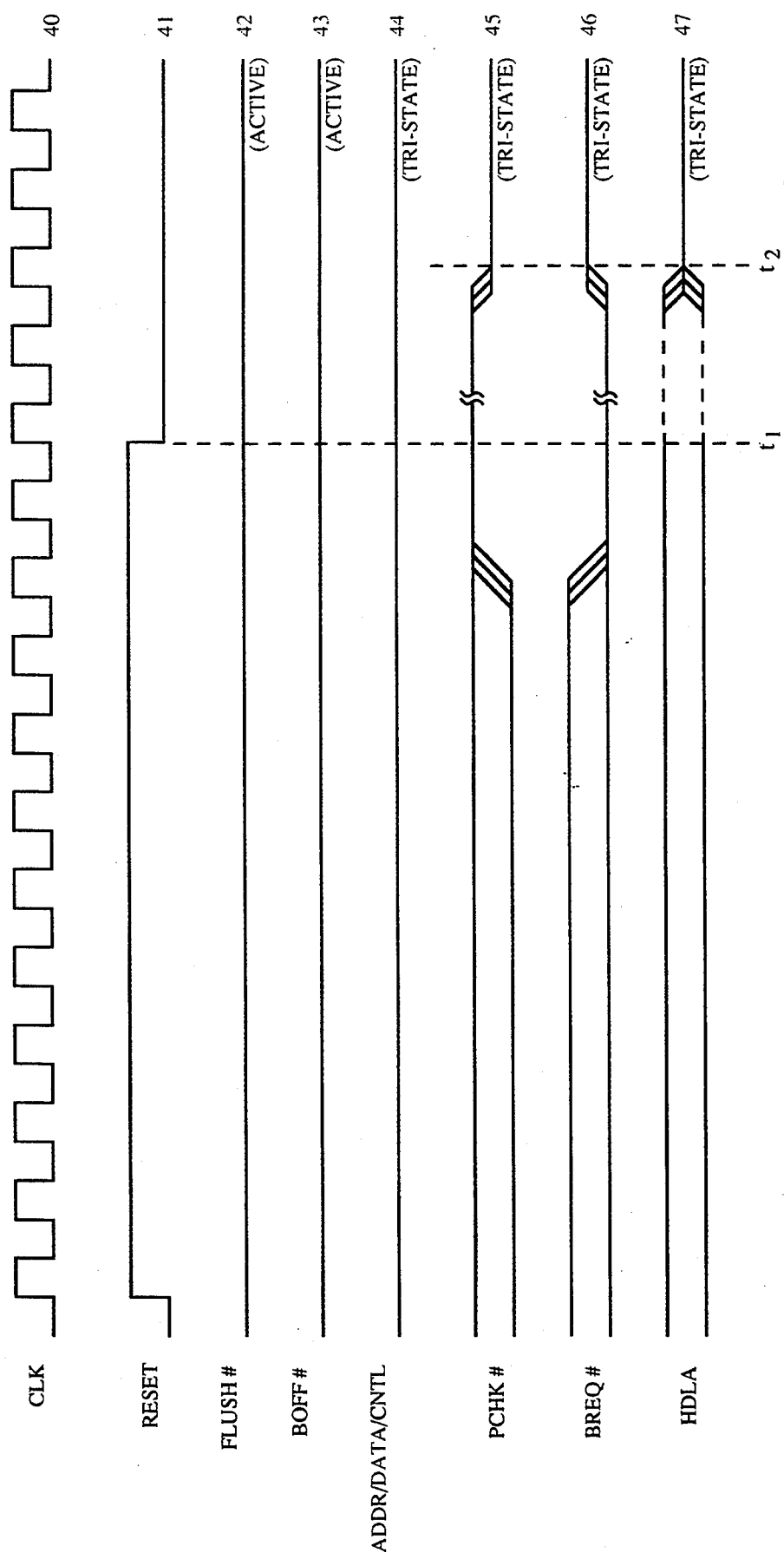
FIG. 3 is a timing diagram showing the disabling sequence of the upgradeable microprocessor-based computer processing system of the present invention.

In the preferred embodiment of the present invention, this disabling process is triggered by the MP# pin of the second microprocessor 20 being grounded. In this way, when the computer processing system powers up, a low logic signal is sent to AND gates 11 and 12 thereby causing each of their respective outputs to also be a low logic signal. Referring now to FIG. 3, because BOFF# of microprocessor 10 is active low (that input reacts to a low signal as opposed to a high signal) and because the BOFF# input signal is sensed on every clock cycle, when AND gate 12 outputs a low logic signal to microprocessor 10's BOFF# input (see BOFF# timing signal 43 shown continuously held in a low state due to the grounded MP# pin of microprocessor 20), microprocessor 10 disables all of its output signal lines (with the exception of PCHK# timing signal 45, BREQ# timing signal 46 and HDLA timing signal 47) in the next clock cycle. This partially disabled back-off condition can be seen by comparing the ADDR/DATA/CNTL timing signal 44 to the PCHK# 45, BREQ# 46 and HDLA 47 timing signals of FIG. 3 during the period prior to time $t_1$. Placing microprocessor 10 in this partially disabled back-off condition, (used in the prior art to prevent microprocessor 10 from colliding/contending with another processor on another PCB simultaneously wishing to access ADDRESS bus 30, CONTROL bus 31 and DATA bus 32), is used in the present invention to suspend as much of microprocessor 10's activities as possible, as quickly as possible, following start-up of the computer processing system.

Of course, the remaining active output signal lines, namely PCHK#, BREQ# and HLDA, must also be disabled in order to fully disable microprocessor 10. This is accomplished via AND gate 11 of FIG. 2 and is also in response to the grounded MP# pin of microprocessor 20 located in the socket on the PCB. AND gate 11's low output logic signal is input to FLUSH# of microprocessor 10 which, like BOFF#, is active low. Microprocessor 10 does not, however, sense FLUSH# on every clock cycle (as it does BOFF#) and thus PCHK#, BREQ# and HLDA are not immediately disabled upon computer processing system startup. Instead, in the preferred embodiment of the present invention, microprocessor 10 senses FLUSH# only on the falling edge of RESET (time $t_1$ in FIG. 3) at which time microprocessor 10 disables its remaining active output signal lines PCHK#, BREQ# and HLDA. This is shown by the period following time $t_2$ of FIG. 3 (where the period between time $t_1$ and time $t_2$ is the time in which microprocessor 10 is disabling the remaining active output signal lines PCFtK#, BREQ# and HLDA). Placing microprocessor 10 in this completely disabled condition, (used in the prior art to disable microprocessor 10 in order to test the PCB to which microprocessor 10 is connected without any interference from microprocessor 10), is used in the present invention to disable all of microprocessor 10's activities so as to entirely remove microprocessor 10's processing and functioning from the remainder of the computer processing system.

Please note that in the preferred embodiment of the present invention, when microprocessor 20 is located in the socket of the PCB, because MP# is grounded, AND gate 11 continuously outputs a low logic signal to the FLUSH# input to microprocessor. However, because microprocessor 10 only senses FLUSH# on the falling edge of RESET as stated above (see time $t_1$ of FIG. 3), the input to FLUSH# need not be maintained in a continuously low logic state (as is shown by timing signal 42 of FIG. 3) after time $t_1$ in order to keep all of microprocessor 10's signal lines disabled. Furthermore, once microprocessor 10 has been placed in the fully disabled state by the FLUSH# signal, the BOFF# signal need no longer be maintained in a continuously low logic state (as is shown by timing signal 43 of FIG. 3).

Also please note that in the preferred embodiment of the present invention, when the output signal lines of microprocessor 10 are disabled they are in what is known as a "tri-state" or floating condition whereby they are at neither a high nor a low logic level. Of course, in an alternative embodiment, if microprocessor 10 had an input signal line which turned microprocessor 10 on and off (e.g., an enable input signal line), then microprocessor 10 could be disabled by merely turning microprocessor 10 off (no longer enabling microprocessor 10), in which case microprocessor 10's output signal lines would be disabled and thus remain in a low logic level state.

Further, referring again to FIG. 2, whenever microprocessor 20 is located in the socket of the PCB, thereby disabling microprocessor 10 from the remainder of the computer processing system, and if a HOLD signal is asserted by a system administrator/arbitrator of the computer processing system, microprocessor 20 would respond with a HLDA output signal which would be input to OR gate 13 which would thereby output a high logic level signal thus acknowledging receipt by microprocessor 20 of the HOLD signal. Of course, because microprocessor 10 is fully disabled when microprocessor 20 is placed in the socket of the PCB, microprocessor 10 will not issue a HLDA output signal in response to the HOLD signal. However, if microprocessor 20 was not located in the socket of the PCB, microprocessor 10 would respond to the HOLD signal with a HLDA output signal via OR gate 13, as is discussed more fully below.

Also please note the inclusion of additional signal lines (e.g., IGNNE# and FERR#) to microprocessor 20 in the socket of the PCB which signal lines are used by the math co-processor portion of microprocessor 20. Additionally, in order to provide the processing functionality of, and execute the same instruction set as, microprocessor 10, microprocessor 20 includes all of the other pin-outs to signal lines normally used by microprocessor 10 in order to be able to, for instance, communicate with ADDRESS bus 30, CONTROL bus 31 and DATA bus 32.

It is important to note that, generally speaking, if a part other than microprocessor 20 were placed in the socket of the PCB, this other part would not function properly in the computer processing system. For example, if a typical math co-processor, not having full microprocessor processing capabilities (and which would thus require microprocessor 10 to still function), were placed in the socket of the PCB, although the math co-processor might somehow obtain power and/or clock signals, because no dedicated signal lines are present on the PCB to handle the data transmission and handshaking protocols between microprocessor 10 and this math co-processor, this math co-processor would be prevented from properly functioning. Of course, if this math co-processor did happen to obtain power through one of the signal lines, there is the potential for bus contention on ADDRESS bus 30, CONTROL bus 31 or DATA bus 32 between this math co-processor and microprocessor 10, or any other processor in the computer processing system for that matter.

Additionally, if a part not able to execute the same instruction set as microprocessor 10 were placed in the socket of the PCB, this other part would still not be able supplant the processing capabilities of microprocessor 10 and would thus not function properly in the computer processing system even if it did somehow gain power.

Further, even if the math co-processor without full microprocessor processing capabilities happened to have a grounded pin located where the MP# pin is located, although this would still cause microprocessor 10 to be disabled (in accordance with the steps and circuitry as described herein), because a mere math co-processor lacks the remainder of the functionality of a complete microprocessor this would still not be a properly functional or operational configuration.

It is also important to note that the present invention provides for a fully functional and operational system even when microprocessor 20 is not placed in the socket of the PCB. In other words, if microprocessor 10 were the only microprocessor located on the PCB, this would still provide a fully functional system. This is achieved by the disabling circuitry of the present invention whereby when no signals (e.g., grounded MP# pin) are output from microprocessor 20, again because of its absence from the socket on the PCB, all of the normal input and output signals to and from microprocessor 10 operate properly. For example, when microprocessor 20 is absent, the MP# signal line input to both AND gate 11 and AND gate 12 of FIG. 2 is maintained at a high logic level due to the connection of VCC through resistor 16. In this way, when the system administrator/arbitrator of the computer processing system issues either a FLUSH# or a BOFF# signal (a low logic signal because these signals are active low and, thus, normally held high) to this PCB, the appropriate AND gate (gate 11 in the case of a FLUSH# signal, gate 12 in the case of a BOFF# signal) outputs a low logic signal to microprocessor 10 to signal the appropriate command.

Likewise, when microprocessor 20 is absent and a HOLD signal is issued, microprocessor 10 will issue a HLDA output signal. This HLDA output signal from microprocessor 10 will be transmitted via OR gate 13 with no interference from the empty socket on the PCB. The reason the empty socket on the PCB does not interfere with the normal operation of a HLDA output signal from microprocessor 10 is because of the presence of grounded resistor 14 which keeps the first input to OR gate 13 at a low logic level whenever the socket is empty.

It should be further understood that the circuitry shown on the PCB in FIG. 2 could be handled by either or both of the microprocessors, microprocessor 10 and microprocessor 20. In this way, intelligence on the microprocessor chips would handle the disabling function handled by the AND gates, OR gates, resistors and signal lines of the currently preferred embodiment of the present invention. This intelligence on the microprocessors could be handled by either hardware or software. This alternative embodiment, although requiring the microprocessors to provide additional logic or software, would eliminate the specialized circuitry on the PCB as described herein.

In the foregoing specification, the invention has been described with reference to the presently preferred embodiment thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. A computer system comprising:
   a first processor having a first plurality and a second plurality of output signals, said first processor disabling said first plurality of output signals in response to an active first disabling signal and disabling said second plurality of output signals in response to an active second disabling signal;
   a socket for receiving a second processor;
   a logic circuit coupled to receive a first and a second line, said first and second lines being coupled to said socket, said logic circuit being coupled to said first processor for providing said active first disabling signal and said active second disabling signal;
   a third line coupled to said socket and said logic circuit, said third line for carrying a third signal; and
   said logic circuit for providing said active first disabling signal and said active second disabling signal when said third signal is active, said third signal being active when the second processor is engaged in said socket.

2. The computer system of claim 1 wherein said logic circuit when said third signal is not active for providing said active first disabling signal and said active second disabling signal in response to signals on said first and second lines, respectively.

3. The computer system of claim 2 wherein said first processor is surface mounted on a printed circuit board and said socket is on said printed circuit board.

4. The computer system of claim 3 wherein said logic circuit is comprised of circuitry on said printed circuit board.

5. The computer system of claim 2 wherein said logic circuit is comprised of circuitry in said first processor.

6. The computer system of claim 2 wherein said active first disabling signal disables said first plurality of output signals independently of whether said first processor is in a reset state and said active second disabling signal disables said second plurality of output signals only when said first processor is not in the reset state.

7. A computer system comprising:
   a first processor having a first plurality and a second plurality of output signals, said first processor disabling said first plurality of output signals in response to an active first disabling signal and disabling said second plurality of output signals in response to an active second disabling signal;
   a socket;
   a second processor engaged in said socket;
   a logic circuit coupled to receive a first and a second line, said first and second lines being coupled to said socket, said logic circuit being coupled to said first processor for providing said active first disabling signal and said active second disabling signal;
   a third line coupled to said socket and said logic circuit, said third line for carrying a third signal, said third signal being active upon the presence of said second processor in said socket; and
   said logic circuit for providing said active first disabling signal and said active second disabling signal when said third signal is active such that said second processor is exclusively utilized.

8. The computer system of claim 7 wherein said logic circuit when said third signal is not active for providing said active first disabling signal and said active second disabling signal in response to signals on said first and second lines, respectively.

9. The computer system of claim 7 wherein said first processor and said second processor are coupled to a common system bus comprising address, control and data lines.

10. The computer system of claim 7 wherein said first processor is surface mounted on a printed circuit board and said socket is on said printed circuit board.

11. The computer system of claim 10 wherein said logic circuit is comprised of circuitry on said printed circuit board.

12. The computer system of claim 7 wherein said logic circuit is comprised of circuitry in said first processor.

13. The computer system of claim 7 wherein said active first disabling signal disables said first plurality of output signals independently of whether said first processor is in a reset state and said second disabling signal disables said second plurality of output signals only when said first processor is not in the reset state.

14. The computer system of claim 7 wherein said first processor is a microprocessor and said second processor is a microprocessor which is capable of executing the same instruction set as said first processor and has greater performance than said first processor.

15. The computer system of claim 7 wherein said first processor is a microprocessor and said second processor is a microprocessor which is capable of executing the same instruction set as said first processor and has additional processing features over said first processor.

16. The computer system of claim 7 wherein said second processor having a third plurality and a fourth plurality of output signals, said second processor disabling said third plurality of output signals in response to an active third disabling signal and disabling said fourth plurality of output signals in response to an active fourth disabling signal, said first and second lines for providing said active third and fourth disabling signals, respectively.

17. In a computer system having a first microprocessor coupled to a bus with the bus being coupled to a main memory where the first microprocessor has terminals for receiving a flush signal, a back-off signal and a reset signal, said flush, back-off, and reset signals each having an active and an inactive state, an improvement for permitting the upgrade of the computer system comprising:

a socket for receiving a second microprocessor, said socket being coupled to the bus, said socket including terminals for receiving the flush signal, the back-off signal and the reset signal; and a logic circuit for causing the back-off signal and the flush signal to the first microprocessor to be in the active state when said second microprocessor is engaging said socket.

18. The computer system of claim 17 wherein said logic circuit for providing the back-off signal and the flush signal to the first microprocessor independent of whether the back-off signal and the flush signal are provided to the second microprocessor.

19. The computer system of claim 18 wherein the first microprocessor is surface mounted on a printed circuit board and said socket is on said printed circuit board.

20. The computer system of claim 19 wherein said logic circuit is comprised of circuitry on said printed circuit board.

21. The computer system of claim 18 wherein said logic circuit is comprised of circuitry in the first microprocessor.

22. The computer system of claim 18 wherein the back-off signal disables a first plurality of output signals independently of whether the reset signal is active and the flush signal disables a second plurality of output signals only when the reset signal is inactive.

23. The computer system of claim 18 wherein said second processor is capable of executing the same instruction set as the first microprocessor and has greater performance than the first microprocessor.

24. The computer system of claim 18 wherein said second microprocessor is capable of executing the same instruction set as the first microprocessor and has additional processing features over the first microprocessor.

25. In a computer system having a first processor, the first processor having a first plurality and a second plurality of output signals, the first processor disabling the first plurality of output signals in response to an active first disabling signal and disabling the second plurality of output signals in response to an active second disabling signal, a method for upgrading said computer system comprising the steps of:

providing a socket for receiving a second processor;

providing a logic circuit coupled to receive a first and a second line, said first and second lines being coupled to said socket, said logic circuit being coupled to the first processor for providing the active first disabling signal and the active second disabling signal;

providing a third line coupled to said socket and said logic circuit, said third line for carrying a third signal, said logic circuit for providing the active first disabling signal and the active second disabling signal when said third signal is active, and said logic circuit when said third signal is not active for providing the active first disabling signal and the active second disabling signal in response to signals on said first and second lines, respectively;

engaging said second processor in said socket; and activating said third signal upon said engaging such that said second processor is exclusively utilized when said second processor is engaged in said socket.

26. The method of claim 25 further comprising the steps of:

surface mounting the first processor on a printed circuit board; and mounting said socket on said printed circuit board.

* * * * *

UNITED STATES PATENT AND TRADEMARK OFFICE
CERTIFICATE OF CORRECTION

PATENT NO. : 5,410,726
DATED : April 25, 1995
INVENTOR(S) : Baqai et al.

It is certified that error appears in the above-identified patent and that said Letters Patent is hereby corrected as shown below:

In column 5 at line 3 delete "PCFtK#" and insert --PCHK#--

Signed and Sealed this

Twenty-ninth Day of July, 1997

Attest:

BRUCE LEHMAN

*Attesting Officer*  *Commissioner of Patents and Trademarks*